Nov. 30, 1937.  J. A. STAHLE  2,100,362

CLUTCH CONSTRUCTION

Filed Nov. 23, 1933  2 Sheets-Sheet 1

Inventor.
John A. Stahle
by Heard Smith & Tennant.
Attys.

Nov. 30, 1937.　　　J. A. STAHLE　　　2,100,362

CLUTCH CONSTRUCTION

Filed Nov. 23, 1933　　　2 Sheets-Sheet 2

Inventor.
John A. Stahle
by Heard Smith & Tennant
Attys.

Patented Nov. 30, 1937

2,100,362

UNITED STATES PATENT OFFICE 2,100,362

CLUTCH CONSTRUCTION

John A. Stahle, Boston, Mass., assignor of one-half to Thorwald Lillemoen, Watertown, Mass.

Application November 23, 1933, Serial No. 699,349

4 Claims. (Cl. 192—68)

This invention relates to clutches and particularly to clutches of that type in which the driven clutch member is made with a hub fast on the driven shaft, an outer clutch portion and a yielding or resilient connection between the hub and the outer clutch portion to absorb the shock or jar when the clutch is thrown into engagement whereby any torsional oscillations of the driving clutch member will be dampened before reaching the driven shaft.

One of the objects of the invention is to provide an improved form of yielding connection between the clutch portion and the hub portion of the driven clutch member which permits the use of resilient elements that offer a less resistance to compression strain than is required of the resilient elements in clutches as now commonly made. This object is attained by employing a series of levers which are pivotally connected either to the clutch portion or the hub portion of the driven clutch element in such a way that each lever provides a long and a short lever arm, and employing a driving connection which operates through the short arm of each lever, the longer arm of each lever being backed by the resilient elements.

In order to give an understanding of the invention I have illustrated in the drawings some selected embodiments of the invention which will now be described after which the novel features will be pointed out in the appended claims.

Inasmuch as the present invention relates solely to the driven clutch member I have not thought it necessary to illustrate herein a complete clutch.

Figure 2:
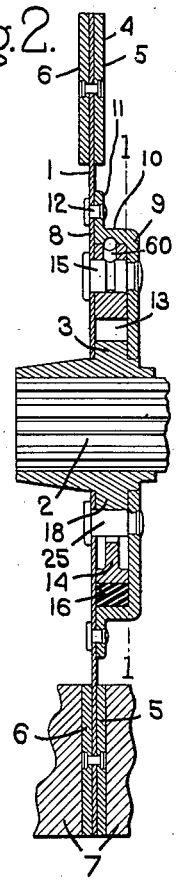
Fig. 2 is a section through the line 2—2, Fig. 1.

In the drawings 1 indicates generally a driven member of a clutch which is fast on a driven shaft 2. This driven clutch member comprises the hub portion 3 which is fast on the shaft 2 and the outer or clutching portion 4 which is provided with the friction clutch surfaces 5, 6 that are adapted to be engaged by corresponding clutch surfaces on the driving clutch member. In Fig. 2 I have shown at 7 a portion of the driving clutch member which is illustrated as in clutching engagement with the friction faces 5, 6.

The driving clutch member may have any suitable or usual construction and any usual means may be provided for throwing the clutch surfaces into and out of clutching engagement.

As stated above the present invention relates to that type of clutch in which the clutching portion and the hub portion of the driven clutch member are resiliently connected.

The outer or clutching portion of the driven clutch member includes a clutch disk 8 having a central opening through which the hub 3 extends and this clutch disk has secured to it a circular plate 9 which is formed with the outer offset portion 10 and with the peripheral flange 11 that is riveted or otherwise fixedly secured to the disk plate 1 as by means of rivets 12.

The hub 3 extends through both the plate 9 and disk 8 and is capable of a slight turning or rotary movement in said disk and plate.

The resilient driving connection between the clutching portion 4 of the driven clutch member, which includes the disk 8 and plate 9, and the hub portion 3, is located in the space 13 between the plate 9 and disk 8. This driving connection comprises a plurality of two-armed levers pivoted to one of the parts of the driven clutch member and having a driving connection with the other part, said levers being backed by a suitable resilient backing which is normally under some compression. In the preferred embodiment of my invention these levers are pivoted to the outer or clutching portion of the clutch member. In the construction shown in Fig. 1, for instance, there are three such levers indicated at 14, each lever being pivotally mounted on a stud 15 mounted in the plate 9 and disk 8 as shown in Fig. 2.

Figure 1:
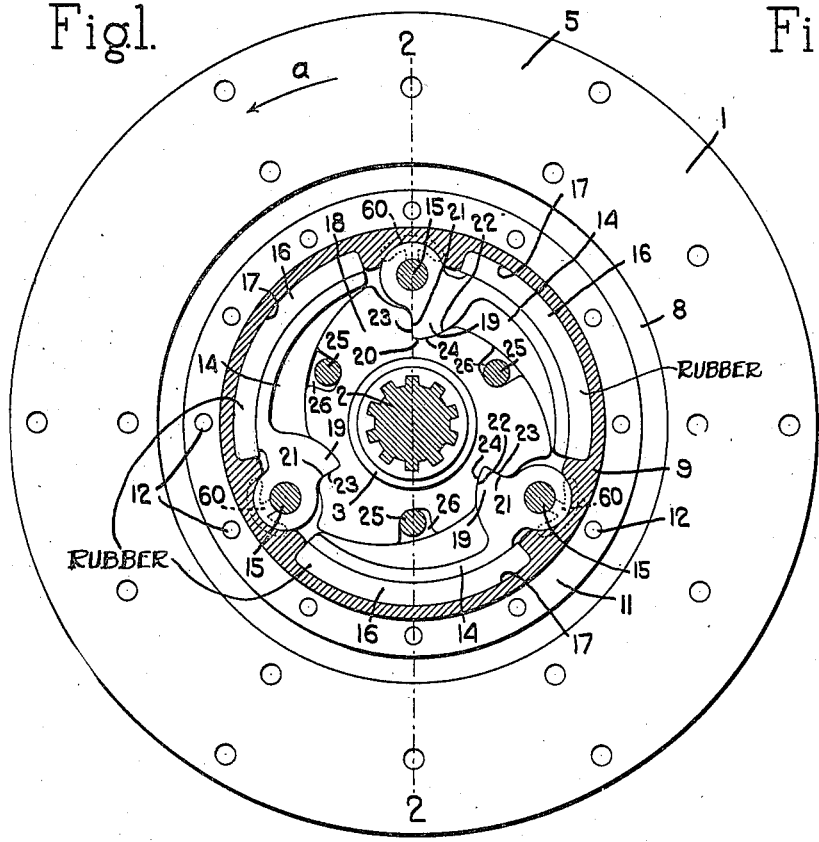
Fig. 1 is a view of a driven clutch member embodying my invention.

Each lever 14 is constructed with a long arm and a short arm and the long arm of each lever is backed by a resilient backing element shown in Fig. 1 as a block 16 of rubber or some other resilient material. These rubber blocks 16 are shown as set into recesses 17 formed in the member 9. The hub portion 3 of the clutch member is provided with an outwardly-extending flange 18 which is received between the plate 9 and the disk 8 and with which the levers 14 have a driving connection. In the embodiment shown in Fig. 1 the short arm of each lever is formed by the extension 19 which fits into a notch 20 formed in the flange 18. This extension or short arm 19 is made with a radial edge 21 and with a curved edge 22 and the notch 20 has the radial edge 23 and the curved edge 24.

The driven clutch member will be rotating in the direction of the arrow $a$ in Fig. 1 and when the clutch is thrown into engagement the clutching portion 4 of the clutch will also be turned in the direction of the arrow $a$. This torsional strain will be conveyed from the outer clutching portion 4 of the clutch member to the hub portion 3 through the contacting faces 21, 23 of the extension or short lever arm 19 and notch 20 respectively. The pressure of the face 21 of each lever against the face 23 of the corresponding notch thus acts through the short arm 19 of the lever tending to turn the lever counterclockwise about its pivot 15. Such turning movement of the lever is resisted by the resilient backing 16. Continued and increasing pressure of the face 21 against the face 23 will cause the hub portion 3 and the shaft 2 to be turned. The presence of the resilient blocks or members 16 thus provides a cushioned driving connection between the clutching portion 4 of the clutch member 1 and the hub portion 3, and this cushioned driving connection takes up shock or jar so that the starting of the shaft 2 will be an easy cushioned one.

Since the torsional strain is transmitted from the clutch member 4 to the hub member 3 through the short arm of the levers 14 and since the resilient elements form the backing for the long arms of said levers, said resilient elements are not subjected to the full torsional strain and consequently a lighter resilient element will provide the necessary resilient connection than if the entire torsional strain were transmitted directly through the resilient element. This enables me to use rubber blocks 16 which are softer and have a greater yielding capacity than is possible in other clutch constructions with which I am familiar.

Figure 3:
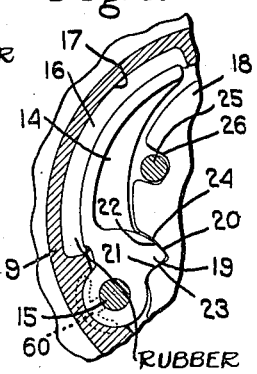
Fig. 3 is a fragmentary sectional view showing the operation of the cushioned levers in transmitting torsional strain.

Fig. 3 shows the relative position of the hub and lever as the clutch is thrown into operation and when the lever has been swung backwardly thereby compressing the resilent backing 16.

Means are provided for limiting the relative turning movement of the hub portion 3 and the clutching portion 4. Such means is in the form of pins 25 which are carried in the plate 9 and disk 8 and each of which extends through a notch 26 formed in the flange 18. Normally each pin 25 will be resting against one side of the notch 26 but as the cushion members 16 yield when the clutch is thrown into operation said pins 25 will assume the position shown in Fig. 3.

Figure 4:
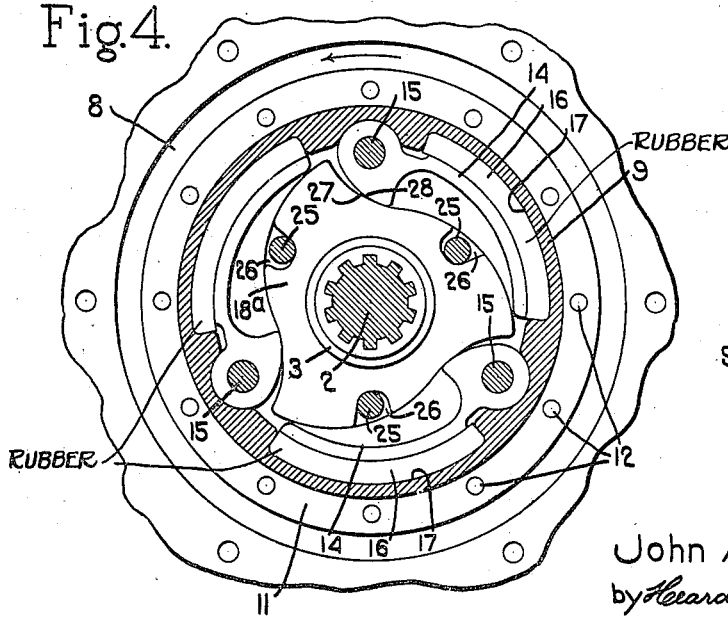
Figs. 4, 5, 6 and 7 are fragmentary sectional views showing different embodiment of the invention.

In Fig. 4 I have shown an embodiment of the invention having a slightly different driving connection between the hub portion 3 and the levers 14. In this embodiment of the invention the hub is provided with the flange portion 18a which is formed with a cam surface 27 adapted to engage a co-operating cam surface 28 formed on the lever 14. As the clutching portion 4 is turned in the direction of the arrow the engagement of the cam faces 27, 28 will operate first to swing the lever 14 backwardly slightly against the action of the cushion members 16 and will then operate to drive or rotate the hub member 3 and the driven shaft 2.

The cam surfaces 27 and 28 are designed so that they have a rolling contact with each other rather than a slipping or friction contact.

In the construction shown in Fig. 4 the portion of the lever 14 having the cam face 28 is the short arm thereof and when the device is in operation and the levers 14 are turned about their pivots by transmission of torsional strain from the clutching portion to the hub portion the rolling contact results in progressively shortening the short arm of the lever thereby giving the long arm an increased leverage. This has the advantage that as the torsional strain increases the leverage against which the resilient element acts also increases.

Figure 5:
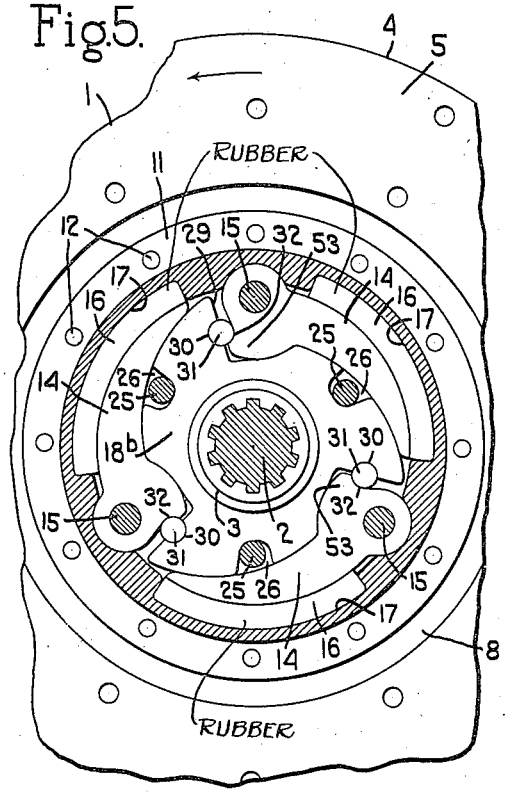

In Fig. 5 I have shown still a different embodiment of the invention. In this construction the hub portion 3 of the driven clutch member is provided with a flange 18b which is formed with substantially radial faces 29 each having a recess 30 therein in which is received a ball or roller 31. This ball or roller engages the face 32 of the extension or projection 53 of the lever 14. As the clutching member is rotated in the direction of the arrow Fig. 5 the torsional strain will be applied to the flange 18b of the hub through the faces 32 of the levers 14 and the rolls 31 and as the direction of the application of the force between the face 32 and roll is spaced from the center of the pivot pin 15 such force tends to swing the levers 14 backwardly against the resistance of the resilient cushion 16 thereby producing the cushion effect above described.

Figure 6:
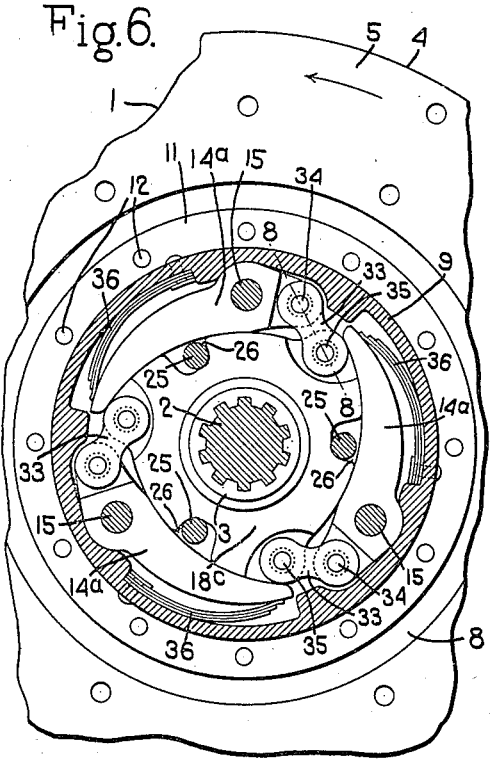
Figure 7:
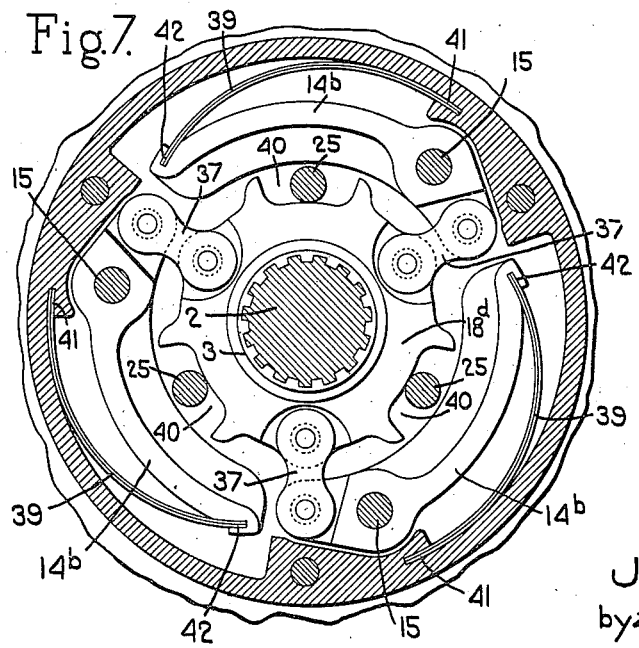
Figure 8:
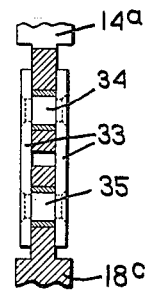
Fig. 8 is an enlarged section on the line 8—8, Fig. 6.

In Figs. 6 and 7 I have shown embodiments of the invention where the driving connection between the cushioned levers and the hub of the clutch member is through the medium of links. In the embodiment of the invention shown in Fig. 6 the levers are indicated at 14a, they being pivotally mounted on the pivot pins 15 as described in the other constructions. The short arm of each lever is connected by a pair of links 33 to the flange 18c of the hub member 3, said links being pivoted to the lever at 34 and to the flange 18c at 35.

The long arm of each lever 14 is backed by a suitable resilient member which may be in the form of rubber blocks as shown in the other embodiments of the invention or may be in the form of a metal spring 36 as shown in Fig. 6. In either event, when the clutch is thrown and the clutch member 4 is turned in the direction of the arrow the torsional strain will be conveyed from the member 4 to the flange 18c of the hub 3 through the links 33 and such strain will tend to turn the levers 14a about their pivots 15 against the action of the springs 36 thereby providing the necessary cushion effect. The springs 36 are herein shown as leaf springs, each comprising a plurality of leaves so that the power or resistance of the spring will increase as it is compressed.

In Fig. 7 I have shown another embodiment of the invention which includes the link connection between the levers and the hub member. In this embodiment, however, the links normally have a radial position and this is a construction which might be used where the clutching member 4 is capable of rotating in either direction. In the device shown in Fig. 7 the levers are indicated at 14b and are pivotally mounted on pivot pins 15 the same as in the other constructions. The short arm of each lever is connected to the flange portion 18d of the hub 3 by links 37 and these links normally have the radial arrangement shown. The long arm of each lever is backed by a suitable resilient means such as a spring 39. With this construction if the clutching member 4 is turned in either direction relative to the hub 3 the torsional strain will be delivered to said hub 3 through the links 37 and in so doing the levers 14b will be swung backwardly against the action of the springs 39 thereby giving the desired cushioned action. In this construction also the flange portion 18d of the hub 3 is provided with relatively wide notches 40 in which the stop pins 25 are received and said pins are normally situated centrally of the notches 40. This allows for the slight relative turning movement in either direction between the clutching portion 4 and the hub portion 3 of the driven clutch member.

The springs 39 are shown as leaf springs and one end of each spring is received in a pocket 41 formed in the portion 9 and the other end is received in a pocket 42 formed in the corresponding lever 14b. With this construction the pressure applied to the spring is to a great extent in the direction of its length and such as to tend to buckle the spring rather than to flatten it. A spring of this nature will give greater resistance than the leaf spring type shown in Fig. 6.

In all embodiments of the invention the hub portion and the clutching portion 4 are held centered with respect to each other partly by the pins 25 which are carried in the clutching portion and are received in notches in the flange of the hub portion, and partly by the bearing of the plate 9 and disk 8 on the hub portion 3.

The link construction shown in Figs. 6 and 7 has the advantage that as the torsional strain increases, the effective leverage through which the resilient member operates also increases and this permits the use of a lighter resilient member for giving a desired cushion effect than if the entire torsional strain were transmitted directly through said lever.

In all embodiments of the invention the resilient backing is normally under some tension. In other words, when the levers are in the position shown in either Figs. 1, 4, 5, 6 or 7 the resilient backing, whether in the form of the rubber block 16, or the springs 36 or 39, is under some compression. The compression, of course, is increased as the torsional strain is applied to rotate the clutch but the resilient means is at all times exerting a pressure against the levers tending to swing them inwardly.

60 indicates lubricant-containing chambers formed partially in the part 9 and partially in the levers 14 (see Figs. 1, 2 and 3), which chambers are adapted to contain lubricant for lubricating the bearing surface between the levers 14 and the pins 15.

I claim:

1. Clutch mechanism comprising a driven shaft, a driven clutch member thereon having a hub portion fast on the shaft and provided with a radial flange and also having a clutching portion encircling the hub portion, said clutching portion having means for engagement with a driving clutch member, a plurality of levers pivoted to the clutching portion, and each having a short arm and a long curved arm substantially concentric with the shaft, a resilient backing for each lever, links permanently connecting each lever with the flange of the hub portion, whereby transmission of torsional strain from the clutching portion to the hub portion will produce a swinging movement of the levers against the action of the resilient backing.

2. Clutch mechanism comprising a driven shaft, a driven clutch member thereon having a hub portion fast on the shaft and a clutching portion encircling the hub portion and capable of a limited turning movement relative thereto, said clutching portion having means for engagement with a driving clutch member, a plurality of two-armed levers pivoted to one portion of the driven clutch member, each lever having a long arm extending at substantially right angles to a radial line and also having a short arm, a resilient backing for the long arm of each lever on the outside thereof, and a permanent torsional-strain-transmitting connection between the short arm of each lever and the other portion of the driven clutch member said hub and clutching portion having cooperating means other than the levers to limit the relative turning movement between them.

3. Clutch mechanism comprising a driven shaft, a driven clutch member thereon having a hub portion fast on the shaft and a clutching portion encircling the hub portion and capable of a limited turning movement relative thereto, said clutching portion having means for engagement with a driving clutch member, a plurality of two-armed levers pivoted to the clutching portion of the driven clutch member, each lever having a long arm extending at substantially right angles to a radial line and also having a short arm, a resilient backing for the long arm in each lever on the outside thereof, and a permanent torsional-strain-transmitting connection between the short arm of each lever and the hub portion of the driven clutch member said hub portion and clutching portion having cooperating means other than said levers to limit the relative turning movement between them.

4. Clutch mechanism comprising a driven shaft, a driven clutch member thereon having a hub portion fast on the shaft, a clutching portion encircling the hub portion and capable of a slight turning movement relative thereto, a plurality of levers pivoted to the clutching portion of the driven clutch member, each lever presenting a long arm and a short arm, a resilient backing for the long arm in each lever on the outside thereof, and a torsional-strain-transmitting connection between the short arm of each lever and the hub portion of the driven clutch member operating with a progressively decreasing short arm leverage as the torsional strain increases.

JOHN A. STAHLE.